(12) United States Patent
Bratten

(10) Patent No.: US 6,612,314 B2
(45) Date of Patent: Sep. 2, 2003

(54) PROCESS FOR REMOVING OIL CONTAINING MACHINING FLUID FROM MACHINED CHIPS

(76) Inventor: Jack R. Bratten, 4657 Twin Fawn La., Orchard Lake, MI (US) 48324

(*) Notice: Subject to any disclaimer, the term of this patent is extended or adjusted under 35 U.S.C. 154(b) by 0 days.

(21) Appl. No.: 09/896,108

(22) Filed: Jun. 29, 2001

(65) Prior Publication Data

US 2003/0000552 A1 Jan. 2, 2003

(51) Int. Cl.[7] .............................. B08B 3/02; B08B 3/04; C23G 5/00
(52) U.S. Cl. ............................ 134/25.1; 134/10; 134/40
(58) Field of Search ..................... 134/10, 25.1, 40, 134/104.3, 109

(56) References Cited

U.S. PATENT DOCUMENTS

| | | | | |
|---|---|---|---|---|
| 5,624,579 A | * | 4/1997 | Bratten | 210/783 |
| 5,795,400 A | * | 8/1998 | Berger et al. | 134/10 |
| 5,980,735 A | * | 11/1999 | Bratten | 210/87 |

* cited by examiner

Primary Examiner—Zeinab El-Arini
(74) Attorney, Agent, or Firm—John R. Benefiel

(57) ABSTRACT

A process for removing oil containing machine coolant from machining chips in which the chips are deposited in a sluice and flushing jets of citrus oil based cleanser used as a washing liquid are used to move the chips down the sluice and into a chip separator tank, the coating of oil containing coolant scoured from the chips by the action of the cleanser and flushing jets. The chips are conveyed up a sloping wall of the tank to be moved out of the washing liquid, drained and dried. The washing liquid is pumped out the tank and after removal of the oil is again used to form the flushing jets in the sluice.

7 Claims, 2 Drawing Sheets

PROCESS FOR REMOVING OIL CONTAINING MACHINING FLUID FROM MACHINED CHIPS

BACKGROUND OF THE INVENTION

This invention concerns the removal of cutting fluid adhering to chips produced during the large scale machining of metal parts such as occurs in the production of engine components. Such machining uses cutting fluids which contain both oil and water which function to both cool and lubricate the cutting tool as the machining of a part proceeds. In such large scale production, the cutting fluid is collected from a number of stations and directed to filtration apparatus for removing the metal chips and other solids contaminants to allow recirculation of the cleaned cutting fluid back to the machining stations for reuse.

The metal chips are coated with the cutting fluid containing oil which tends to adhere thereto to not quickly drain away, such that the chips present a disposal problem. The metal chips can be salvaged if the quantity of fluid is reduced to a low level, i.e., 5% or less. Transport of the chip is also a problem since excessive drippage will occur unless the normally adhering fluid is removed.

So called "chip wringers" have been developed to remove residual cutting fluid from steel, cast iron, or aluminum chips by a centrifuging apparatus. See U.S. Pat. No. 6,129,851 for an example of such apparatus. Chip wringers operate at high speed and are costly to make and expensive to maintain.

Washing processes have also been proposed to remove the oil containing fluid, see for example U.S. Pat. Nos. 5,147,554 and 4,565,583, but those processes, typically using magnetic fields or hot pressurized water, are in practice likewise complex and costly.

It is the object of the present invention to provide a simplified process and system for removing water-oil based cutting fluids from machining chips which is less costly to purchase and operate than the prior systems.

SUMMARY OF THE INVENTION

The above recited object and others which will be appreciated upon a reading of the following specification and claims are achieved by a process in which the chips collected in one or more filters are deposited in a sluice and advanced by washing solution flushing jets emanating from nozzles directed down the sluice. The chips are thereby agitated and tumbled while being advanced along the sluice to be thoroughly washed.

The chips and washing solution move down the sluice and into a strainer tank where the washed chips are separated from the washing solution and thereafter drained and dried prior to being collected for disposal.

The washing solution preferably comprises a citrus oil based cleanser which is a powerful detergent of a low molecular weight which is commercially available in a composition which does not foam appreciably. The solution is preferably heated to speed drying of the chips after leaving the solution. A by pass flow of the washing solution is continually circulated through an ultra filter to remove oil washed from the chips, to allow continuous processing using recirculated washing solution.

DESCRIPTION OF THE INVENTION

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
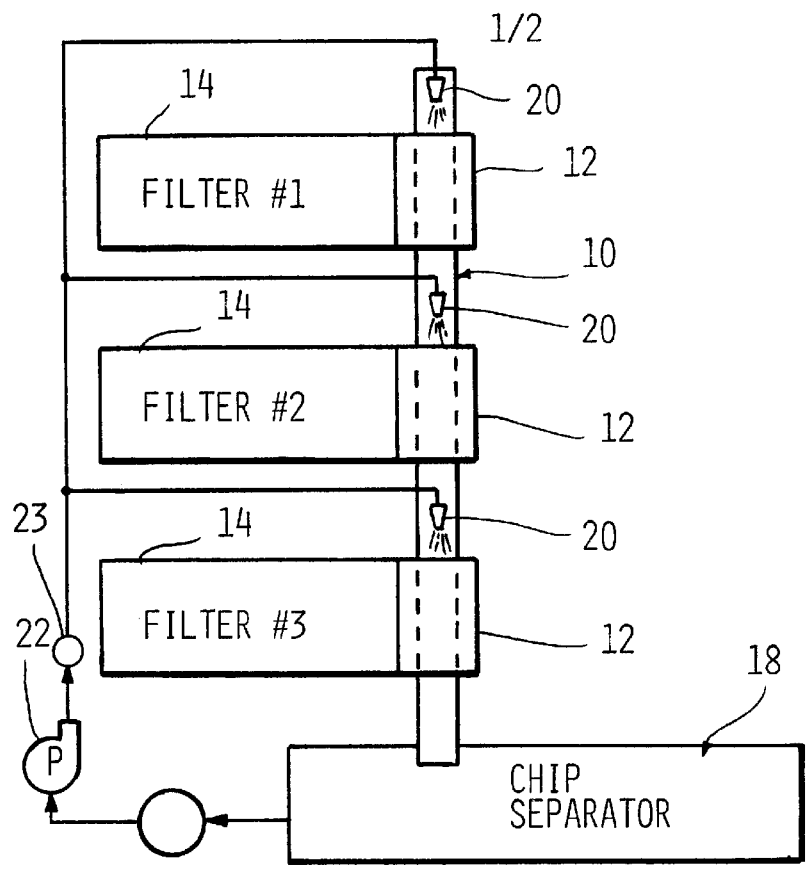
FIG. 1 is a plan view of a diagrammatic series of filtration units with a sluice arranged to receive chips therefrom and a chip separator receiving the chips from the sluice.
Figure 3:
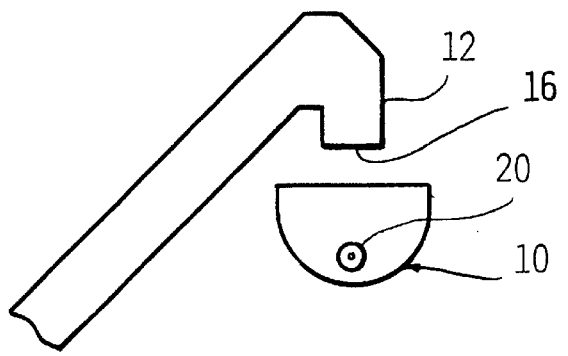
FIG. 3 is a view of a portion of the discharge end of one of the filter units depicted in block diagram form in FIG. 1 and a cross section of the sluice receiving the chips therefrom.

Referring to the drawings, the system according to the present invention includes a down sloping sluice 10 which can either be an above grade trough or a below grade velocity trench extending beneath the discharge end 12 of each of a series of filter units 14 (FIG. 1). The sluice 10 has a flow of liquid established therein as described below which is designed to carry away chips deposited in the sluice 10. The filter units 14 may be of a commercially available type, such as the filters described in U.S. Pat. Nos. 3,087,620; 5,624,579; and 4,396,505. The filters 14 convey machining chips filtered out of the cutting fluid to their discharge end 12, the chips falling down through an opening 16 (FIG. 3) and into the sluice 10. The sluice 10 could comprise a down sloping trough or below grade trench as described in U.S. Pat. No. 5,980,735 to provide an extended liquid flow path to convey the chips and liquid to a chip separator 18.

A large volume (500 gal per minute) of washing liquid is pressurized by a pump 22 and preheated by a heater 23 to a temperature above ambient but not creating a scalding hazard i.e., 105°–120° F. The liquid is then discharged from a series of nozzles 20 creating flushing liquid jets directing down the length of the sluice 10 to convey the chips deposited therein from the filters 12 to the chip separator 18. The flushing jets emanating from the nozzles 20 creates a powerful tumbling and scouring action on the coated chips deposited therein, effectively washing the surfaces thereof to remove the cutting fluid adhering thereto.

The chip separator 18 separates the washed chips from the washing liquid.

The washing liquid is preferably water containing a known powerful detergent/degreaser based on citrus oils and available commercially. This biodegradable washing liquid is available in a composition which advantageously does not have a tendency to foam, allowing the use of high pressure flushing jets without resulting in an excessive volume of suds.

Additionally, this substance is of lower molecular weight than the soluble oils used in the cutting fluids, so that the oil can be filtered out while leaving the citrus oil cleanser in solution in the water by use of an ultra filter, as described below. However, other detergents/degreasers could also be used.

Figure 2:
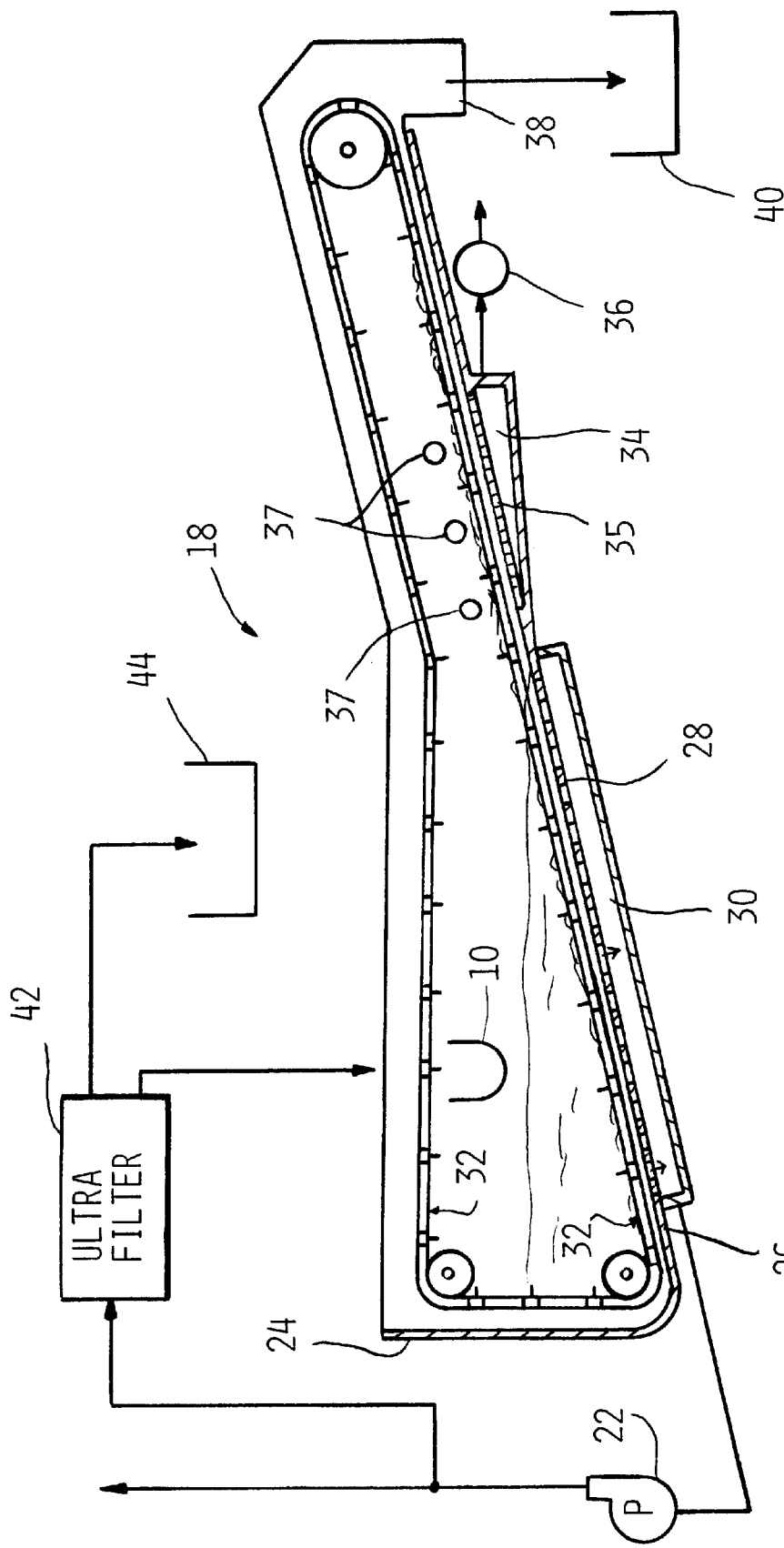
FIG. 2 is an elevational view of a diagrammatic representation of the chip separator depicted in block diagram form in FIG. 1.

FIG. 2 depicts one form of a chip separator 18 which may be employed to separate the chips from a washing liquid.

This includes an open tank 24 into which the sluice 10 empties. The tank 24 has a sloping bottom 26 to collect the liquid and chips at the left side as viewed in FIG. 2. A bottom section 28 having openings such as slots or perforations overlies a vacuum box 30 in similar fashion to the filters referenced above. The inlet to the pump 22 is connected to the vacuum box 30 drawing out liquid to maintain the level of liquid in the tank 24 indicated in FIG. 2.

A recirculated flight chain conveyor 32 is provided to carry the chips up the sloping bottom wall 26 and out of the washing liquid, and over a drain chamber 34, also covered with a perforated or slotted plate 35 to allow liquid to drain off the chips and back down into the tank 24. A bank of radiant heaters 37 and a blower 36 drawing air over the chips can aid the drying and draining of the liquid from the chips.

The flight conveyor 32 carries the drained and dried chips further up the sloping tank bottom 26 to an elevated discharge end of the tank 24, where the drained and dried chips fall through discharge opening 38 and into a collection receptacle 40.

A minor portion of the strained washing liquid is diverted through an ultra filter 42 to continuously remove some of the accumulated oil picked up by the washing liquid during the washing process.

Ultra filters are commercially available device used to separate out heavier molecular weight substances from a liquid, by passage through very fine openings (0.0015 microns) at moderate pressures (40 psi). A purified flow of about 5 gpm would be adequate to keep the washing liquid sufficiently free of oil for use. These devices have been used to remove oil from water. See U.S. Pat. Nos. 4,929,351; 5,795,400; 4,655,927; and 3,984,324. The cleaning agent described will not be filtered out to the same extent, and thus the filtered wash liquid can be returned to the tank 24. The separated oil is collected in a separate receptacle 44, for disposal.

A residual fluid on the chips of 5% or lower can thus be achieved.

What is claimed is:

1. A process of removing oil containing machining fluid adhering to machining chips discharged from a filter unit comprising the steps of:
    depositing said chips in a sluice;
    advancing said chips along said sluice by directing one or more flushing jets of a washing liquid down said sluice, said washing liquid of a composition to remove oil from said chips;
    discharging said chips and washing liquid into a chip separator tank; and
    removing said chips from said washing liquid in said tank.

2. The process according to claim 1 further including the steps of drawing washing liquid out of said tank while straining said chips out of said washing liquid; removing oil from said washing liquid; and thereafter pressurizing said washing liquid from said tank to form said one or more flushing jets.

3. The process according to claim 2 wherein said washing liquid is of low molecular weight and said oil is removed from said washing liquid by a step of ultra filtration.

4. The process according to claim 1 wherein a non foaming citrus oil based detergent cleanser is utilized for said washing liquid.

5. The process according to claim 1 wherein said chips are advanced up a sloping bottom wall of said tank to be removed from said washing liquid.

6. The process according to claim 5 wherein said tank bottom wall has a section with openings over which said chips are advanced to allow draining thereof.

7. The process according to claim 1 further including the step of preheating said washing liquid prior to discharging the same into said sluice as said flushing jets to heat said chips and thereby speed drying thereof after removal from said washing liquid.

* * * * *